United States Patent [19]

Uchiyama et al.

[11] 4,188,104
[45] Feb. 12, 1980

[54] AUTOMATIC CONTROL DEVICE FOR ELECTRONIC FLASH

[75] Inventors: Takashi Uchiyama, Yokohama; Tetsuya Taguchi, Kawasaki; Yukio Mashimo, Tokyo, all of Japan

[73] Assignee: Canon Kabushiki Kaisha, Tokyo, Japan

[21] Appl. No.: 759,063

[22] Filed: Jan. 13, 1977

Related U.S. Application Data

[63] Continuation of Ser. No. 471,561, May 20, 1974, abandoned.

[30] Foreign Application Priority Data

May 24, 1973 [JP] Japan .................................. 48/58369

[51] Int. Cl.² ............................................ G03B 15/05
[52] U.S. Cl. ...................................... 354/31; 354/33; 354/149
[58] Field of Search ........................... 354/27, 31–34, 354/126, 139, 145, 149, 60 F, 35, 127, 128; 315/241 P

[56] References Cited

U.S. PATENT DOCUMENTS

| 3,667,357 | 6/1972 | Matsuda | 354/50 X |
| 3,699,858 | 10/1972 | Ogiso et al. | 354/51 X |
| 3,779,142 | 12/1973 | Yata et al. | 354/33 |
| 3,836,920 | 9/1974 | Uchiyama et al. | 354/27 |
| 3,855,601 | 12/1974 | Uchiyama et al. | 354/31 |

*Primary Examiner*—L. T. Hix
*Assistant Examiner*—William B. Perkey
*Attorney, Agent, or Firm*—Toren, McGeady and Stanger

[57] ABSTRACT

A photographic device includes means for automatic control of the quantity of light from an electronic flash by comparing the brightness of a main object to be photographed with the brightness of a sub-object to be photographed, and the shutter of the camera opens during the time in response to the brightness of a sub-object to be photographed.

12 Claims, 6 Drawing Figures

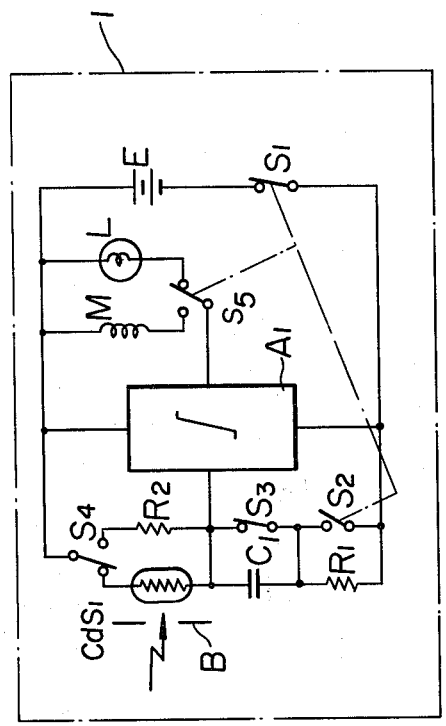
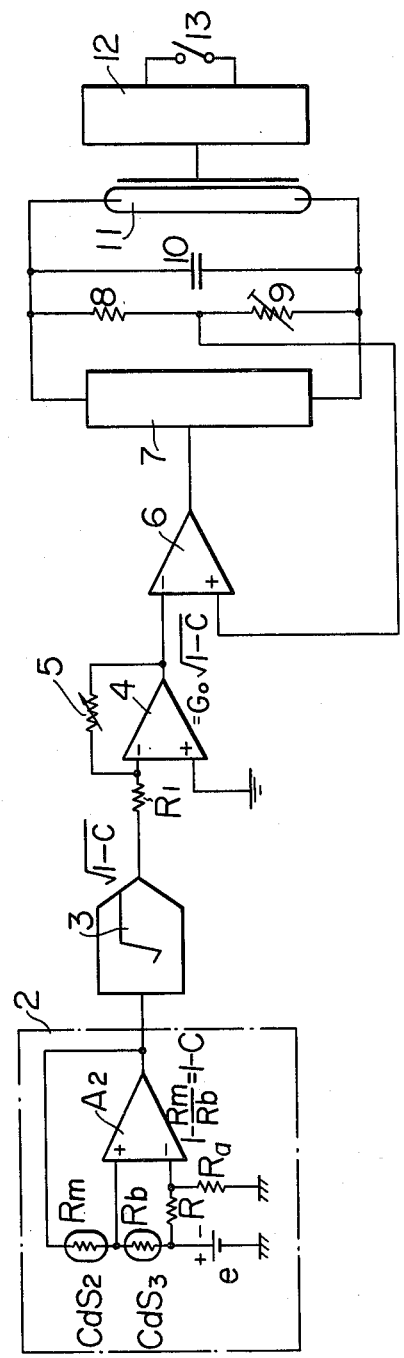
FIG. 2

$G = G_0 \sqrt{1-C}$ $G = G_0 \sqrt{1-C}$

AUTOMATIC CONTROL DEVICE FOR ELECTRONIC FLASH

This is a continuation of application Ser. No. 471,561 filed May 20, 1974, now abandoned.

BACKGROUND OF THE INVENTION

1. Field of the Invention

The present invention relates to an electronic flash device, particularly an electronic flash device in which the light quantity is controlled through comparison of the brightness of a main object and the brightness of a sub-object.

2. Description of the Prior Art

According to the conventional electronic flash device, the light quantity from a flash tube is measured by a light sensitive element, and the light quantity is controlled in correspondence to the output signal of the light sensitive element, and almost no consideration has been given to the natural light. Therefore, the conventional device has a defect that exposure errors occur during flash photograph under the presence of the natural light.

This defect has been solved by the device disclosed in U.S. Pat. No. 3,591,829 in which the light from the flash tube and the natural light are detected separately by an electronic filter, and the flashing of the flash tube is designed to stop when the total of the two lights reaches a predetermined value.

However, the device disclosed by U.S. Pat. No. 3,591,829 has a defect that proper exposure cannot be obtained for sub-objects which constitute the background of main objects such as personal figures and flowers, although proper exposure can be obtained for the main objects.

SUMMARY OF THE PRESENT INVENTION

One of the objects of the present invention is to provide an electronic flash device which can give proper exposure to both main objects and sub-objects during flash photographing when the main object is irradiated with the natural light.

Another object of the present invention is to provide an electronic flash device in which the quantity of flash light is controlled by the ratio between the brightness of the main objects and the brightness of the sub-objects.

Other objects of the present invention will be understood from the following description referring to the attached drawings.

BRIEF DESCRIPTION OF THE DRAWINGS

FIG. 2 shows an electric circuit connection illustrating one embodiment of the device of the present invention.

DESCRIPTION OF THE PRESENT INVENTION

Prior to description of the embodiments of the present invention, explanation will be made concerning how the quantity of flash light of a flash device should be controlled when natural light is incident on the main object.

When flash photographing is performed using an electronic flash device, the actual quantity of light of the flash device may be represented by P, and if the quantity P is expressed by a guide number and designated as G, $$G = \sqrt{Ko \cdot P \cdot Sx} \tag{1}$$

in which Sx represents the film sensitivity in ASA and Ko is a constant determined taking into account factors such as reflection rate and so on. If the light amount corresponding to the guide number G is given to an object on which no natural light is irradiated, the diaphragm value Fo must satisfy the equation $$Fo = G/D \tag{2}$$

in order that an object at a distance D has a proper exposure.

Figure 5:
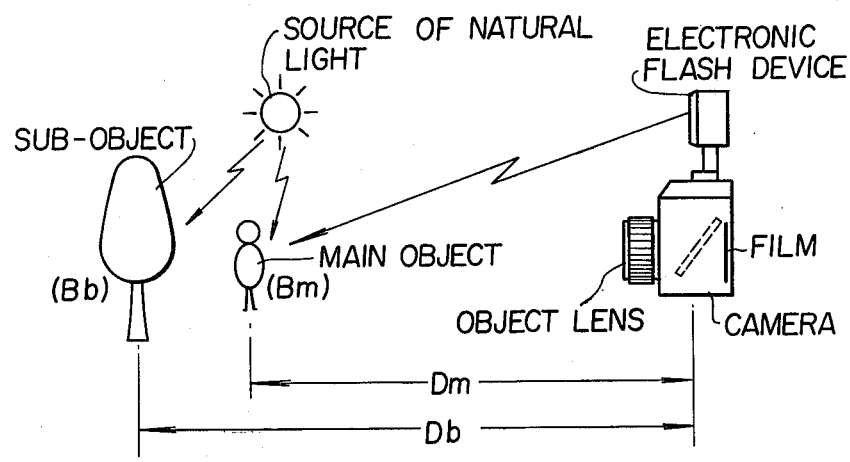
FIG. 5 is a schematic view for explaining the relation between a camera on which an electronic flash device is mounted and a main object as well as a sub-object.

If brightness by the natural light of a main object and brightness by the natural light of a sub-object (objects in the total screen excluding the main objects) are given as Bm, Bb respectively, and their distances from the flash device are given as Dm, Db, then respectively (FIG. 5). The exposure amounts Em, Eb on the films in the case when the main object and sub-object are irradiated simultaneously by the natural light and the flash light are given by the following formula $$Em = (\pi Bm/4F^2) \cdot T + (\pi K/4Sx) \cdot (Fom^2/F^2) \tag{3}$$

$$Eb = (\pi Bb/4F^2) \cdot T + (\pi K/4Sx) \cdot (Fob^2/F^2) \tag{4}$$

in which F is the diaphragm value and T is the shutter time.

In the above formula, Fom and Fob are respectively a diaphragm value to be set for assuring proper exposure for both of the objects when both of the objects are irradiated only by the flash light, and are given by $$G = Dm \cdot Fom \tag{5}$$

$$G = Db \cdot Fob \tag{6}$$

In general, Em or Eb must be equal to $$Eo = (\pi K/4Sx) \tag{7}$$

in order that the main object or the sub-object has proper exposure. In the formula, K is a constant which must be taken into consideration when an exposure meter is used as means for setting the diaphragm value, and Eo is usually set around 0.1 lux.sec. against $Sx = 100$. Therefore, the conditions for assuring proper exposure for the main object or the sub-object are expressed by the following formula Main object:
$$(\pi Bm/4F^2) \cdot T + (\pi K/4Sx) \cdot (G^2/F^2 Dm^2) = \pi K/4Sx \tag{8}$$

Sub-object:
$$(\pi Bb/4F^2) \cdot T + (\pi K/4Sx) \cdot (G^2/F^2 Db^2) = \pi K/4Sx \tag{9}$$

As understood from the formulas (8) and (9), when the value of the first or second terms in the left side is not negligibly large as compared with the value of the second or first term proper exposure cannot be obtained in the case of day-light photographing even by a so-called EE photographing device which controls exposure based on the assumption that G (or P)=0. or a so-called flash-auto device which controls exposure based on the assumption that Bm=0.

Next formulation of conditions for assuring proper exposure for the main object and the sub-object simultaneously will be explained. Since it is necessary to satisfy Em=Eb=Eo for assuring proper exposure simultaneously for both of the main object and the sub-object, the associated equation of the formulas (8) and (9) is solved under the condition of Em=Eb=Eo;

$$F = \frac{G}{Dm} \sqrt{\frac{1 - C \cdot Cf^2}{1 - C}}$$
$$= \frac{1}{Dm} \sqrt{Ko \cdot P \cdot Bx} \sqrt{\frac{1 - C \cdot Cf^2}{1 - C}}$$
$$= \sqrt{T} \sqrt{\frac{Sx \cdot Bb}{K}} \sqrt{\frac{1 - C \cdot Cf^2}{1 - Cf^2}}$$
(10)

in which $$C = Bm/Bb, \quad Cf = Dm/Db \tag{11}$$

As described above, the diaphragm value in the electronic flash device according to the present invention is set by a flash-auto device, but it is not set in correspondence to the actual quantity of light P of a flash device at the time of flash photographing, and it is set in correspondence to the maximum quantity of light Po (and film sensitivity) obtained when the flash device is made to flash to its maximum degree. Namely the diaphragm value is set so as to satisfy the equation in respect to the maximum guide number corresponding to Po.

$$F = Go/Dm \tag{12}$$

in which $$Go = \sqrt{Ko \cdot Po \cdot Sx} \tag{13}$$

If the formula (12) is substituted in the formula (10) for proper exposure $$F = \frac{Go}{Dm} = \frac{G}{Dm} \sqrt{\frac{1 - C \cdot Cf^2}{1 - C}} = \sqrt{T} \sqrt{\frac{Sx \cdot Bb}{K}} \sqrt{\frac{1 - C \cdot Cf^2}{1 - Cf^2}} \tag{14}$$

Now, the distance of the sub-object is usually larger than that of the main-object, and thus $$Cf = (Dm/Db) \approx 0 \tag{15}$$

If this equation is substituted in the formula (14), $$G = Go \sqrt{1 - C} \quad (\text{or } P = Po(1 - C))$$

and $$F = \frac{Go}{Dm} = \sqrt{T} \sqrt{\frac{Sx \cdot Bb}{K}} \tag{16}$$

Therefore, in the case when the sub-object is at considerably farther distance than the main object, both the main object and the sub-object are given proper exposure by setting the diaphragm value F in correspondence to the maximum quantity Go (as explained hereinafter) of light of the flash device and the distance Dm from the main object, setting the exposure time T in correspondence to the diaphragm value F, the brightness given by the natural light of the sub-object and the film sensitivity Sx, and by reducing the guide number to be less than Go in correspondence to C.

Next, the significance of $G = Go\sqrt{1 - C}$ in the formula (16) will be explained. In the case when the brightness of the main object and the sub-object provided by the natural light are almost same, $C = Bm/Bb$ is about 1 and thus $G \approx 0$. This seems very natural, but it means that it is not necessary to flash the flash device when there is no difference in the brightness, and, if necessary, a very small quantity of flash light will be enough. In the case of an extremely opposite condition, namely when the brightness of the sub-object is stronger than that of the main object, $C \approx 0$ and $G \approx Go$, it means it is satisfactory if the total light quantity is flashed. The flash device according to the present invention requires fewer steps of variation of light amount as compared with a conventional electronic flash device for automatic flash control so that the control circuit is very easy to design. The flash photographing under day light is required only in the case when the brightness ratio of the main object to that of the sub-object is less than ½ (more than one step of light quantity variation), but even in this case it is satisfactory only to reduce the flash light quantity by $G = Go/\sqrt{2}(P = Po/2)$, namely by one step amount. Even if $C = \frac{1}{4}$, it is enough to reduce the flash light amount by $G = Go/2 (P = Po/4)$, namely by two quantitative steps quantity. Further as clearly understood from the formula of $P = Po\sqrt{1-C}$, the factor which must be considered at the time of controlling the flash light quantity is information of the brightness ratio only, and it is not necessary to consider other factors such as film sensitivity, diaphragm value, time and distance of main objects, and thus the structure of the light quantity controlling device can be greatly simplified. For the above reasons, the flash device of the present invention is very easy to make at low cost.

Regarding the exposure time T in the formula (16), the time T must be increased when the sub-object is dark (namely Bb is small) and the diaphragm value F is large. However, in the case when a long time of exposure is required because the sub-object is dark, a better photograph can be taken by closing the shutter earlier within a range (for example 1/30 second) which does not cause the camera shaking problem in spite of underexposure of the sub-object. In this case, the main object is also dark and the exposure amount by flash light is far larger than that by natural light so that we can assumed $Bm \approx 0$ and the following formula may be used in place of the formula (16)

$$G = Go, \quad F = Go/Dm \text{ and}$$
$$T = To \text{ (for example 1/30 second)} \tag{17}$$

From the above, it is understood that the device has only to be designed so as to satisfy the formula (16) in the case of $Cf = Dm/Df \approx 0$, and when a long time of exposure is not desired in the case of a dark object, it is satisfactory to design the device so as to satisfy the formula (17). However, there is a case when we cannot assume $Cf \approx 0$ such as when we photograph a person in front of a building very close to the person. In such a case, when flash photographing is performed using the device satisfying the formula (16), the sub-object is subjected to over-exposure by the amount of flash light incident upon the sub-object. However, it is very rare that the sub-object is close to the main object and yet the brightness difference is large in the case of daylight photographing, and, even if such a situation takes place, the exposure excess of the back ground is only within one step amount. Also when the brightness difference is small, the light quantity of the flash device satisfying the formula (16) becomes naturally small so that the excessive amount of exposure of the back ground is negligibly small. It has been understood from the above analysis that the device satisfying the formula (16) will be very useful.

The present invention will be described referring to the embodiments shown in the drawings.

Figure 1:
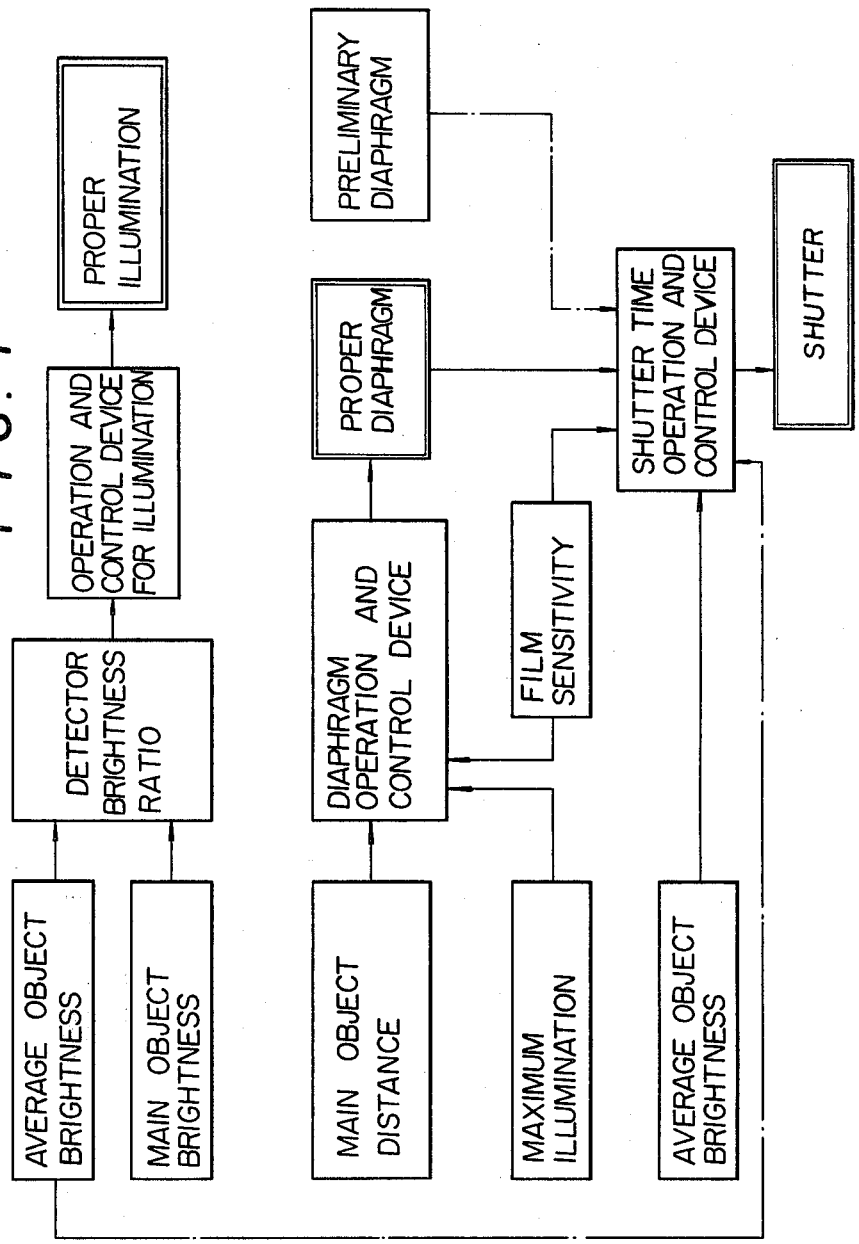
FIG. 1 is a block diagram for explaining the device of the present invention.

FIG. 1 is a block diagram showing a specific embodiment of the present invention. As shown in the drawing, a brightness ratio detecting device to which the brightness of average objects and the brightness of a main object are supplied, is provided. The output of the detecting device is supplied to a light quantity operating and controlling device which functions in association with a discharge tube etc. of the flash device so as to emit a proper light amount from the discharge tube, namely to control the light amount so as to satisfy $P = Po(1-C)$. Meanwhile, information of the distance from a main object, the maximum light quantity (explained hereinafter) of the flash device and the film sensitivity are input to the diaphragm controlling device to assure that the diaphragm diameter of the photographing lens has a proper diaphragm diameter, namely to satisfy the equation $$F = Go/Dm = \sqrt{(Ko \cdot Po \cdot Sx)}/Dm$$

To supply the information of the film sensitivity and the maximum light quantity means to input the maximum guide number which varies depending on the film sensitivity, and to supply the information of the maximum light quantity is to supply the maximum guide number in the case of $Sx = 100$. Further, the information of the above diaphragm, the average brightness of objects and the film sensitivity are supplied to control the shutter so as to obtain a proper time, namely to satisfy $T = F^2 \cdot K/(Sx \cdot Bb)$. As for the light receiving device for measuring the average brightness of an object, the light receiving device of the brightness ratio detecting device may be used, but when it is constructed separately from the flash device and is housed in the light quantity operating and controlling device, the formula (16) is wholly satisfied by this structure due to the information transfer between the flash device and the camera, and both the main object and the sub-object have simultaneously a proper exposure at the time of the flash photographing. In the above descriptions, the information of average brightness of object is almost equivalent to the brightness information of the sub-object, but it represents an average brightness of the whole picture and not a brightness obtained by measuring only the remaining portion other than the main object portion. In general, when the brightness Bm of the main object is very small as compared with the brightness Bb of the sub-object, the average brightness of the whole picture including the main object and the brightness of the sub-object are almost equal. Thus, in the case of $Bb \gg Bm$ as above, the present invention is designed to use the average object brightness.

As for a specific means for controlling the diaphragm and the time using the diaphragm operating and controlling device and the time operating and controlling device as above mentioned, detailed descriptions have been made in British Patent Specification No. 1,325,182.

Hereinunder explanations will be made on the light quantity operating and controlling device of the flash device referring to FIG. 2.

FIG. 2 is an electrical circuit showing one embodiment of the device according to the present invention. In FIG. 2, the circuit connected by the dotted line 1 is an electric shutter controlling circuit which controls the opening and closing time of the shutter, $Cds_1$ is a light receiving element such as a photo-conductive element and a photo-voltaic element which measures the brightness Bb of the sub-object, B is a diaphragm device, $C_1$ is a condenser which forms a time constant circuit together with the light receiving element $Cds_1$, $R_1$ is a resistor for detecting the exposure time, $R_2$ is a resistor for setting the exposure time to 1/30 second and other desired time irrespective of the brightness of the sub-object, $A_1$ is a voltage detecting circuit such as a Schmidt circuit, M is an electro-magnet for actuating the shutter blade, L is a warning lamp for indicating the photographing time, E is an electric source, $S_1$ is a main switch, $S_2$ is a switch for detecting the camera shaking problem, $S_3$ is a count switch which switches off in association with the shutter opening, $S_4$ is a switch for changing over the light receiving element $Cds_1$ and the resistor $R_2$ and $S_5$ is a switch for changing over the warning lamp L and the electromagnet M. The switches $S_1$, $S_2$ and $S_5$ function in association with the shutter release button (not shown), and by the first step push-down of the release button, the switch $S_1$ becomes on, the switch $S_5$ is changed over to the side of the warning lamp L, and the switch $S_2$ becomes off. By the second step push-down, the switch $S_1$ remains on, the switch $S_5$ is changed over to the side of the magnet M, and the switch $S_2$ becomes on. The circuit connected by the dotted line 2 is a brightness ratio detecting circuit which compares the brightness of the main object with that of the sub-object. $Cds_3$ is a light receiving element for measuring the brightness of the sub-object, e is a unit voltage source (for example 1 vol.), R is a resistor for giving supplying the voltage of the unit voltage source to the input terminal of the operation amplifier $A_2$. Ra is a resistor from the input terminal to ground. For example, if the brightness ratio of the main object and the sub-object is $C = Bm/Bb$, the output of the brightness ratio detecting circuit 2 is $1 - C = 1 - Bm/Bb = 1 - Rm/Rb$, in which Bm is the brightness of the main object, Bb is the brightness of the back ground, Rm is the resistance value of light receiving element $Cds_2$ when the brightness Bm is incident upon the main object, Rb is the resistance value of the light receiving element $Cds_3$ when brightness Bb is incident upon the sub-object. 3 is a square root extractor device whose output becomes $\sqrt{1-C}$ when the input is (1−C). 4 is a multiplier composed of an operation amplifier which multiplies the output $\sqrt{1-C}$ of the square root extractor device by the maximum guide number Go of the flash device, and when their inputs are $\sqrt{1-C}$ and Go respectively, the output is Go $\sqrt{1-C}$. 5 is a potentiometer which shows a resistance value corresponding to the maximum guide number Go of the flash device, 6 is a comparator which compares the output Go $\sqrt{1-C}=G$ (guide number required by the flash device) of the multiplier 4 with the guide number of the flash device, and controls a high voltage generator 7 of the flash device. The light quantity controlling circuit is composed of the members 2, 3, 4, 5 and 6. The high voltage generator 7 is controlled by the output of the comparator 6 in such a manner that the energy discharged from the flash device becomes the guide number given by the operators 2 to 4. 8 is a resistor, 9 is a variable resistor for adjustment. 10 is a main condensor, 11 is a flash discharge tube, 12 is a triggering circuit, 13 is a synchronizing contact which is actuated in association with the release button (not shown) of the camera. The guide number G required by the flash device is operated by the operator from the brightness ratio of the main object to the sub-object and the maximum guide number Go of the flash device, namely a guide number Go corresponding to the maximum energy Po generated by the flash device to control the high voltage generator and adjust the guide numbers of the flash device from the maximum value Go to the minimum value O.

Next, the operation of the present invention will be described.

The main object and the sub-object are assumed to be provided incident light corresponding to Bm and Bb respectively as in FIG. 5.

First, the information of the maximum guide number Go of the flash device is set in the potentiometer 5, and when the distance ring (not shown) of the camera is rotated to set the object distance information in the camera, the diaphragm is set in the photographing lens of the camera by the diaphragm device B in correspondence to the two informations Go and the distance information in association with the information setting in the camera.

Figure 6:
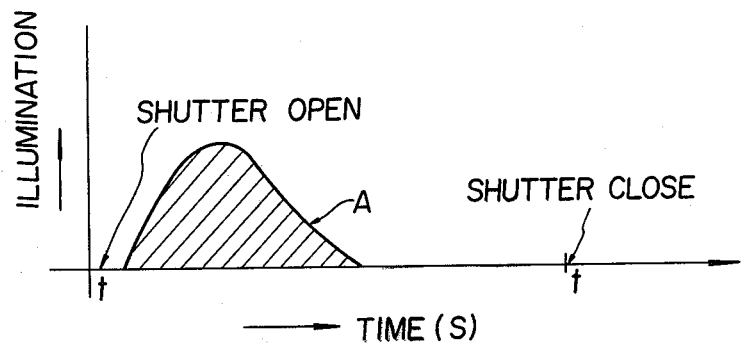
FIG. 6 explains operations of the camera shutter and the electronic flash device.

When the shutter release button (not shown) is pushed down under this state, the voltage detecting circuit A reverses its sign after a certain time in correspondence to the time constant of the time constant circuit composed of the light receiving elements $Cds_1$ and $C_1$ so that the magnet M becomes non-excited to close the shutter. As a result, the sub-object has proper exposure. On the other hand, since the condensor 10 of the flash device is charged with a voltage which makes the flash device flash a light quantity satisfying the formula (16) by the brightness ratio detecting circuit 2 and the light quantity operating and controlling circuits 2, 3, 4, 5 and 6, the flash device flashes as shown by the curve A in FIG. 6 when the synchronizing contact 13 is closed during the shutter actuation, and the main object is irradiated with proper light quantity by the flash device. Therefore, both the main object and the sub-object are given proper exposure. When the shutter release (not shown) is pushed down by one step, the light receiving element $Cds_1$ and the resistor $R_1$ form a bleeder circuit, and the voltage detecting circuit $A_1$ is actuated when the object is dark and the warning lamp L is illuminated. In the case when the warning lamp L is illuminated, the camera operator changes over the switch $S_4$ to the side of the resistor $R_2$ at his discretion. Then the exposure time is determined by the resistor $R_2$ and the condensor $C_1$ irrespective of the object brightness. At this time, if the time constant of the time constant circuit composed of the resistor $R_2$ and the condensor $C_1$ is adjusted so as to obtain an exposure time of 1/30 second, etc., the device of the present invention operates just as a conventional flash device. Also even when the object is dark as above, if the switch $S_4$ is pushed to the side of $Cds_1$, the exposure time is determined by the time constant circuit composed of the light receiving element $Cds_1$ and the condensor $C_1$ and the shutter is closed after a certain time corresponding to the object brightness.

Figure 3:
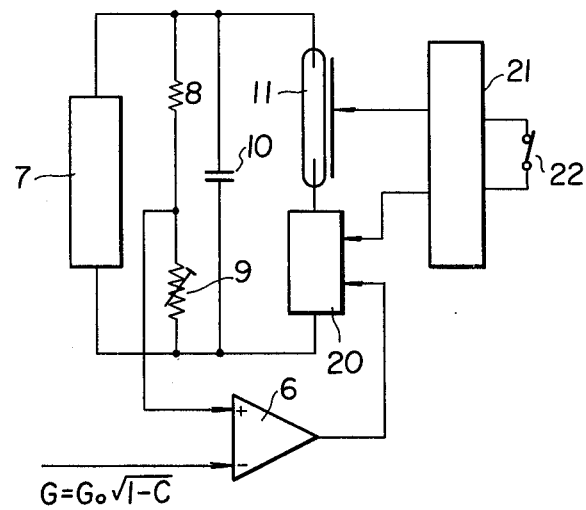
FIG. 3 shows an electric circuit connection illustrating another embodiment of the device of the present invention.

FIG. 3 is an electric circuit showing another embodiment of the present invention composed of a flash device different from that shown in FIG. 2. In FIG. 3, 7 is a high voltage generating circuit for charging the main condensor 10 with a constant high voltage, 8 is a resistor, 9 is a variable resistor, and a voltage value in proportion to the voltage of the condensor 10 is given to the comparator 6 from the contact point between 8 and 9. Since other input terminal of the comparator 6 is connected with the output from the multifier 4 in FIG. 2, the voltage of the condensor 10 lowers as the flash discharge tube is illuminated.

When this voltage lowers to a predetermined value, namely when the discharge energy from the flash discharge tube 11 reaches a predetermined value, signals from the comparator are transferred to the switch circuit 20 which stops the illumination of the flash discharge tube 11, and the discharge tube ceases to illuminate. 21 is a triggering circuit. 22 is a synchronizing contact. The switching circuit 20 becomes conductive upon receipt of signals generated when a high voltage is caused in the flash discharge tube 11 by the signal from the triggering circuit, and becomes non-conductive upon receipt of signals from the comparator 6.

Figure 4:
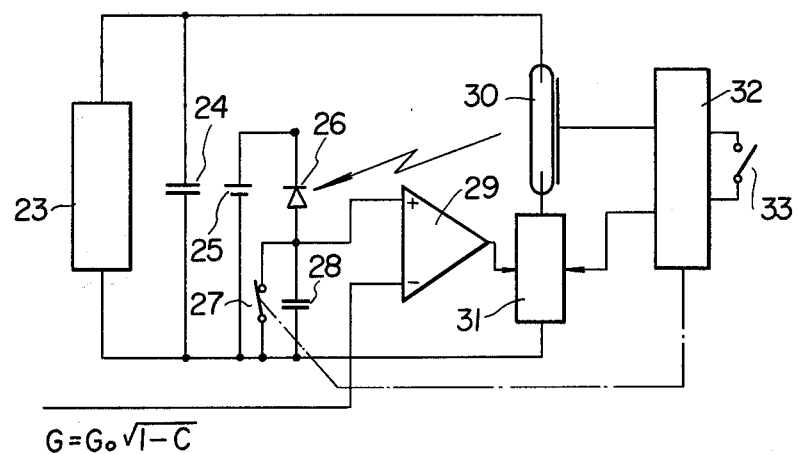
FIG. 4 shows an electric circuit connection illustrating still another embodiment of the device of the present invention.

FIG. 4 is an electric circuit showing still another embodiment of the present invention. In this embodiment, the photo-current of a quick-responsive light receiving element (for example silicon blue cell) receiving the light directly from the flash discharge tube 30 (not receiving the light reflected from the main object) is charged across the condensor 28, and when the charged voltage reaches a predetermined value, namely after the light quantity of a predetermined guide number is discharged, the signal for stopping the flash of the flash discharge tube to make the switching circuit 31 non-conductive and stop the flash of the flash discharge tube 30. 23 is a high voltage generating circuit, 24 is a main condensor, 25 is a battery, 26 is a light receiving element, 28 is a condensor for controlling the flash light quantity, 29 is a comparator, 30 is a flash discharge tube, 31 is a switching circuit, 32 is a triggering circuit, 33 is a synchronizing switch.

In the embodiments shown in FIG. 3 and FIG. 4, in which the flash light quantity is controlled while the exposure is actually made, the flash light is also incident on the light receiving element for measuring the brightness ratio, but as shown in the drawings, difficulty may be overcome by using Cds which does not respond to flash light which extinguishes instantaneously but fully responds to the natural light, namely a constant light. Also, when a quick-response light receiving element is used, it is possible to avoid difficulties by providing a memory means. The same thing can be said concerning the light receiving element Cds₁ of the shutter controlling circuit in FIG. 2.

With the flash device of the present invention constructed as above, the device of the present invention has the advantage that, not only the main object, but also the sub-object is given proper exposure simultaneously. This is in contrast to the conventional device in which the flash photographing is performed by maintaining a constant time (for example 1/30 second) and by adjusting the diaphragm in correspondence to the distance and the guide number (guide number of the flash device whose flash amount can not be adjusted), and that exposure excess caused by the natural light incident upon on the main object is avoided.

What is claimed is:

1. The combination of a camera and an electronic flash device, said electronic flash device comprising:
    brightness ratio detecting means which measures a brightness value of a main portion of a photographing scene upon which natural light is incident and a brightness value of a sub-portion of the scene upon which the natural light is incident, said means producing an electrical signal corresponding to a ratio of one brightness value with respect to the other;
    flash light emitting means for generating a flash light to illuminate the photographing scene; and
    first control means functionally connected to said flash light emitting means for controlling the quantity of the flash light generated by said flash light emitting means, said control being effected in accordance with the electrical signal from said brightness ratio detecting means and a maximum guide number value of the electronic flash device;
    said camera including:
    a first light sensitive element which measures a mean brightness value of the photographing scene upon which the natural light is incident, said element producing an electrical signal corresponding to the mean brightness value;
    second control means which controls the quantity of light incident upon said first light sensitive element and the aperture size of the camera according to said maximum guide number value and information relating to a distance to said main portion of the scene being photographed; and
    third control means connected to said first light sensitive element for controlling an exposure time of the camera according to the electrical signal from said first light sensitive element.

2. The combination according to claim 1, wherein said brightness ratio detecting means includes:
    a second light sensitive element for measuring the brightness value of the main portion of the photographing scene upon which the natural light is incident;
    a third light sensitive element for measuring the brightness value of the sub-portion of the photographing scene upon which the natural light is incident; and
    calculating means connected to said second and third light sensitive elements for producing an electrical signal according to the ratio of an output signal of said second light sensitive element to an output signal of said third light sensitive element.

3. The combination according to claim 2, wherein said calculating means includes an operational amplifier.

4. The combination according to claim 1, wherein said brightness ratio detecting means produces an electrical signal according to the formula of $1-(Bm/Bb)$ wherein Bm represents the brightness value of the main portion of the photographing scene upon which the natural light is incident and Bb the brightness value of the sub-portion of the photographing scene upon which the natural light is incident.

5. The combination according to claim 4, wherein said flash light emitting means includes a flash tube.

6. The combination according to claim 5, wherein said electronic flash device further includes storage means for storing electrical energy to be converted into light energy in the flash tube.

7. The combination according to claim 6, wherein said first control means includes:
    a square root extractor coupled to the output terminal of said brightness ratio detecting means for extracting the square root of the electrical signal produced by said brightness ratio detecting means;
    a setting means for setting the maximum guide number value, said setting means having an output signal:
    a multiplier coupled to the output terminal of said square root extractor for multiplying said output signal produced by said setting means by an output signal produced by said square root extractor;
    light emission terminating means which compares an output signal produced by said multiplier with an output signal produced by said storage means after commencement of light emission by said flash tube and which terminated the light emission when the two signals reach a predetermined relationship.

8. The combination according to claim 7, wherein said setting means is coupled to said multiplier and is composed of a resistor which produces an electrical signal corresponding to the set maximum guide number value.

9. The combination according to claim 8, wherein said multiplier includes an operational amplifier.

10. The combination according to claim 7, wherein said light emission terminating means includes:
    comparator means having input terminals connected to the output terminal of said multiplier and to said storage means respectively; and
    cut off means connected to said flash tube for cutting off the electrical energy supply to said flash tube in response to an output signal of said comparator means.

11. The combination according to claim 10, wherein said cut off means includes switching means connected in series with said flash tube.

12. The combination of a camera and an electronic flash device, said electronic flash device comprising:
    brightness ratio detecting means which measures a brightness value of a main portion of a photographing scene upon which natural light is incident and a brightness value of a sub-portion of the scene upon which the natural light is incident, said means producing an electrical signal corresponding to a ratio of one brightness value with respect to the other;
    flash light emitting means for generating a flash light to illuminate the photographing scene; and
    first control means functionally connected to said flash light emitting means for controlling the quantity of the flash light generated by said flash light emitting means, said control being effected in accordance with the electrical signal from said brightness ratio detecting means and a maximum guide number value of the electronic flash device;

said camera including:

a first light sensitive element which measures a mean brightness value of the photographing scene upon which the natural light is incident and which produces an electrical electrical corresponding to the mean brightness value;

second control means which controls the quantity of light incident upon said first light sensitive element for controlling the aperture size of the camera according to said maximum guide number value and information relating to a distance to said main portion of the scene; and third control means coupled to said first light sensitive element for controlling a shutter opening time of the camera according to the electrical signal from said first light sensitive element, said maximum guide number value and the information relating to the distance to said main portion of the scene.

* * * * *